US009732886B2

(12) United States Patent
Simmons et al.

(10) Patent No.: US 9,732,886 B2
(45) Date of Patent: *Aug. 15, 2017

(54) MODULAR PIPE-SHOE, PIPE-SUPPORT SYSTEM

(71) Applicant: ConXtech, Inc., Pleasanton, CA (US)

(72) Inventors: Robert J. Simmons, Hayward, CA (US); Maxwell C. Simmons, Hayward, CA (US)

(73) Assignee: ConXtech, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,630

(22) Filed: Mar. 21, 2016

(65) Prior Publication Data

US 2016/0305576 A1 Oct. 20, 2016

Related U.S. Application Data

(63) Continuation of application No. 13/350,807, filed on Jan. 15, 201, now Pat. No. 9,291,288.

(60) Provisional application No. 61/434,420, filed on Jan. 19, 2011.

(51) Int. Cl.
| F16L 3/24 | (2006.01) |
| F16L 3/18 | (2006.01) |
| F16L 3/00 | (2006.01) |
| F16L 3/22 | (2006.01) |

(52) U.S. Cl.
CPC .. F16L 3/24 (2013.01); F16L 3/18 (2013.01)

(58) Field of Classification Search
CPC ....... F16L 3/24; F16L 3/18; F16L 3/16; F16L 3/085; F16L 3/1016; F16L 3/1075; F16L 3/1091
USPC ........ 248/72, 188.1, 671, 65, 73, 74.1, 74.3, 248/49, 55, 56, 57; 52/220.1, 651.02, 52/677, 708; 285/64, 124.1–124.3
See application file for complete search history.

(56) References Cited

U.S. PATENT DOCUMENTS

| 317,613 | A | * | 5/1885 | Blake | ........................ | F16L 3/14 |
| | | | | | | 248/59 |
| 497,679 | A | * | 5/1893 | Newbury | .................. | F16L 3/24 |
| | | | | | | 248/72 |
| 1,373,716 | A | * | 4/1921 | Dottl | ........................ | F16L 3/14 |
| | | | | | | 248/72 |

(Continued)

OTHER PUBLICATIONS

U.S. Patent and Trademark Office, Office action in U.S. Appl. No. 13/350,807, dated Mar. 1, 2013, 16 pages.

(Continued)

*Primary Examiner* — Muhammad Ijaz
(74) *Attorney, Agent, or Firm* — Kolisch Hartwell, P.C.

(57) ABSTRACT

A modular system for supporting, on an underlying framework, and at plural pipe-underside locations, an elongate linear pipe. The system includes (a) for each such location, a shoe anchorable to the pipe's underside at that location, (b) for one pipe-underside location only, an anchor securable to the framework for receiving and anchoring the shoe, and thus the pipe also, at this one location, against any motion relative to the framework, and (c) for each other pipe-underside location, a guide securable to the framework for guidably receiving the adjacent shoe in a manner permitting it, and thus the pipe also, at this other location, solely reversible sliding motion relative to the framework along a line substantially paralleling the pipe's long axis.

20 Claims, 3 Drawing Sheets

(56) References Cited

U.S. PATENT DOCUMENTS

Figure 4:
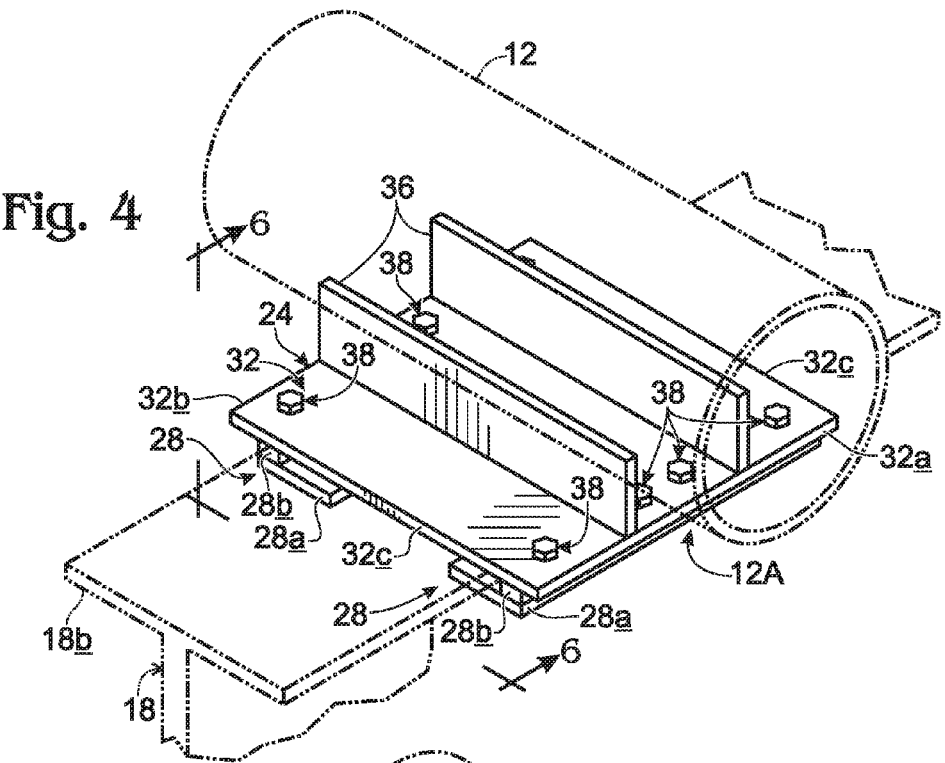

| | | | | |
|---|---|---|---|---|
| 1,470,529 A * | 10/1923 | Gerber | F16L 3/18 | 248/49 |
| 1,474,059 A * | 11/1923 | Voellmecke | F16L 3/24 | 248/72 |
| 1,797,214 A * | 3/1931 | Mayer | F16L 3/24 | 248/68.1 |
| 1,995,340 A * | 3/1935 | Buxton | H02G 7/05 | 248/227.3 |
| 2,117,008 A * | 5/1938 | Oswalt | E02F 7/10 | 14/22 |
| 2,273,571 A * | 2/1942 | Hafemeister | F16L 3/221 | 248/62 |
| 2,470,992 A * | 5/1949 | Kindorf | F16L 3/24 | 248/72 |
| 2,546,593 A * | 3/1951 | Genter | B60M 1/20 | 174/163 R |
| 2,561,540 A * | 7/1951 | Sherbrooke | F16L 3/00 | 248/49 |
| 2,955,790 A * | 10/1960 | Sylvester | H02G 5/025 | 174/171 |
| 2,969,215 A * | 1/1961 | Weaver | E04H 12/28 | 248/49 |
| 3,053,494 A * | 9/1962 | Stoll | F16L 3/24 | 248/228.3 |
| 3,298,644 A * | 1/1967 | Sherburne | F16L 3/16 | 248/55 |
| 3,390,854 A * | 7/1968 | Sherburne | F16L 3/16 | 14/73.5 |
| 3,604,676 A * | 9/1971 | Weber | F16L 3/1075 | 248/231.41 |
| 3,963,205 A * | 6/1976 | Hageman | F16L 3/16 | 248/55 |
| 4,342,474 A * | 8/1982 | Sewell | H01P 1/00 | 248/219.4 |
| 4,403,759 A * | 9/1983 | Hicks | F16L 3/18 | 248/55 |
| 4,826,113 A * | 5/1989 | Winters | F16L 3/24 | 248/228.3 |
| 5,201,546 A * | 4/1993 | Lindsay | E04B 5/14 | 280/789 |
| 5,259,165 A * | 11/1993 | Koyama | E04C 3/06 | 403/387 |
| 5,595,363 A * | 1/1997 | De Leebeeck | F16L 3/24 | 248/72 |
| 5,822,947 A * | 10/1998 | Tarrant | E04B 5/10 | 52/660 |
| 5,924,656 A * | 7/1999 | Okada | F16L 3/00 | 138/106 |
| 6,520,705 B2 * | 2/2003 | Stasney, Jr. | F16B 2/065 | 248/72 |
| 6,874,741 B2 * | 4/2005 | Mirsberger | F16B 2/12 | 248/228.1 |
| 6,994,300 B2 * | 2/2006 | Labeirie | B64C 1/406 | 248/65 |
| 7,293,394 B2 * | 11/2007 | Davis | E04C 3/18 | 52/650.1 |
| 8,480,041 B2 | 7/2013 | Myers | | |
| 2003/0218111 A1 * | 11/2003 | Labeirie | B64C 1/406 | 248/228.1 |
| 2008/0135648 A1 * | 6/2008 | Smiltneek | B01F 3/0412 | 239/557 |
| 2008/0250579 A1 * | 10/2008 | Sten | E01D 19/106 | 14/73 |
| 2009/0183462 A1 * | 7/2009 | Osborn | F16B 2/065 | 52/745.21 |
| 2010/0307098 A1 * | 12/2010 | Yee | E04C 5/168 | 52/677 |
| 2016/0047496 A1 * | 2/2016 | O'Connell | F16L 59/16 | 248/72 |

OTHER PUBLICATIONS

U.S. Patent and Trademark Office, Office action in U.S. Appl. No. 13/350,807, dated Jun. 17, 2013, 12 pages.
U.S. Patent and Trademark Office, Office action in U.S. Appl. No. 13/350,807, dated Mar. 12, 2014, 8 pages.
U.S. Patent and Trademark Office, Office action in U.S. Appl. No. 13/350,807, dated Oct. 10, 2014, 13 pages.
U.S. Patent and Trademark Office, Office action in U.S. Appl. No. 13/350,807, dated Jul. 10, 2015, 15 pages.

* cited by examiner

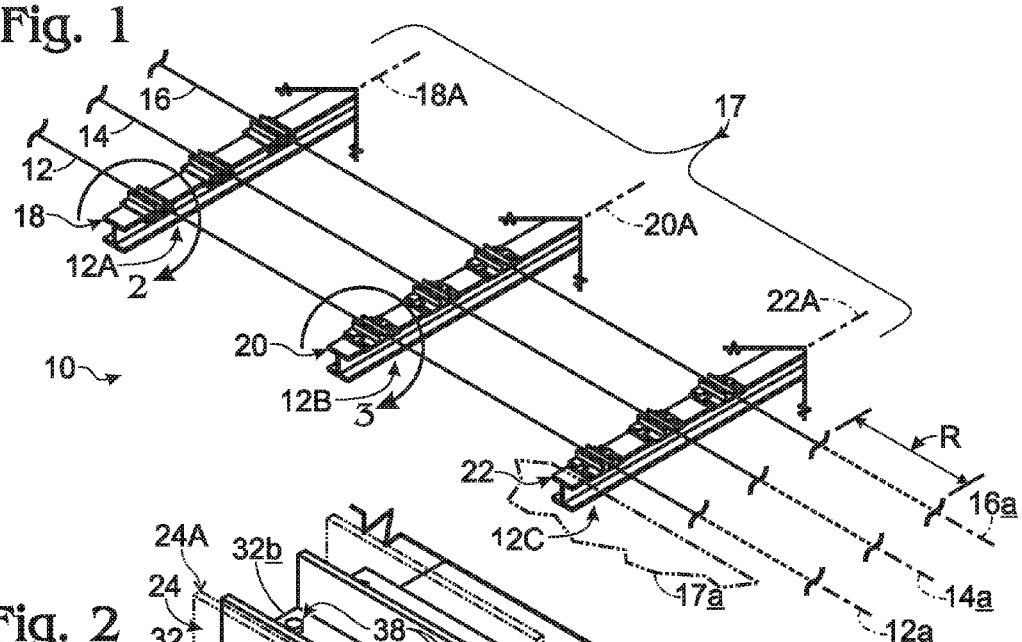
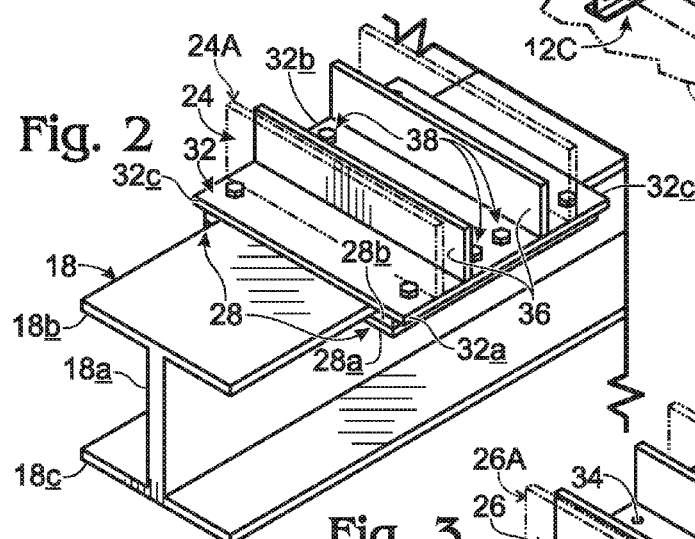
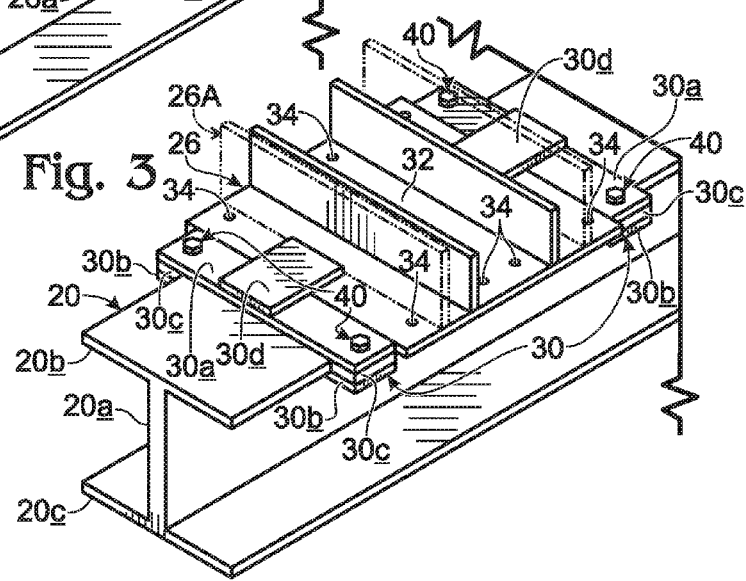

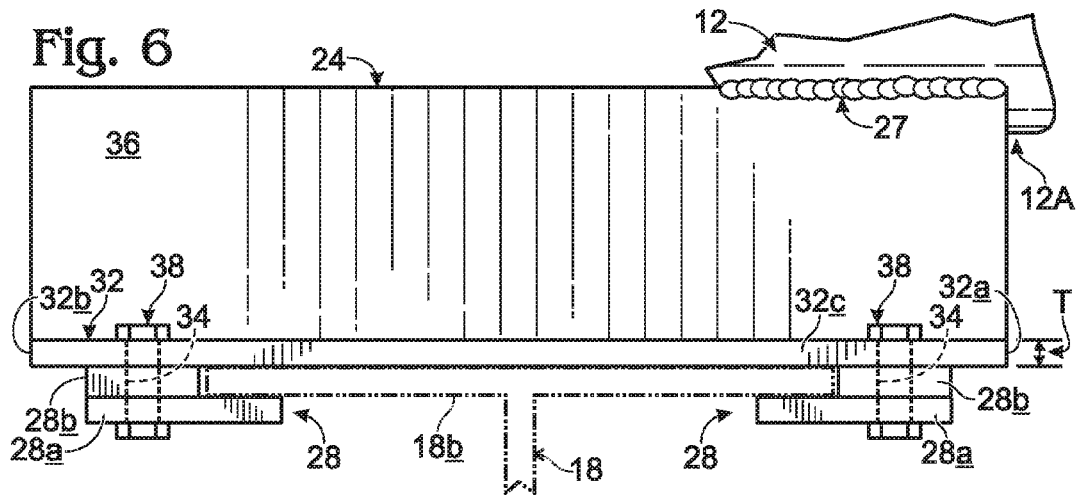
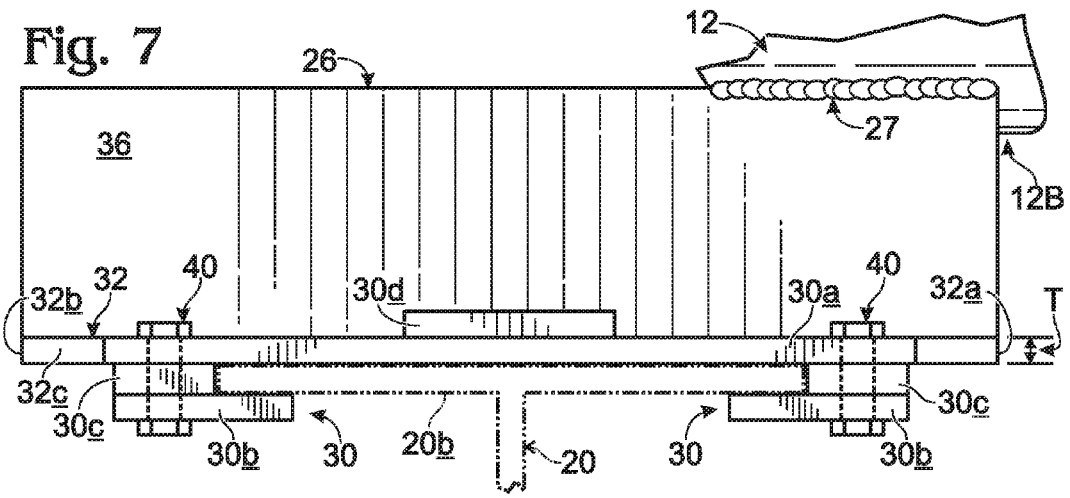
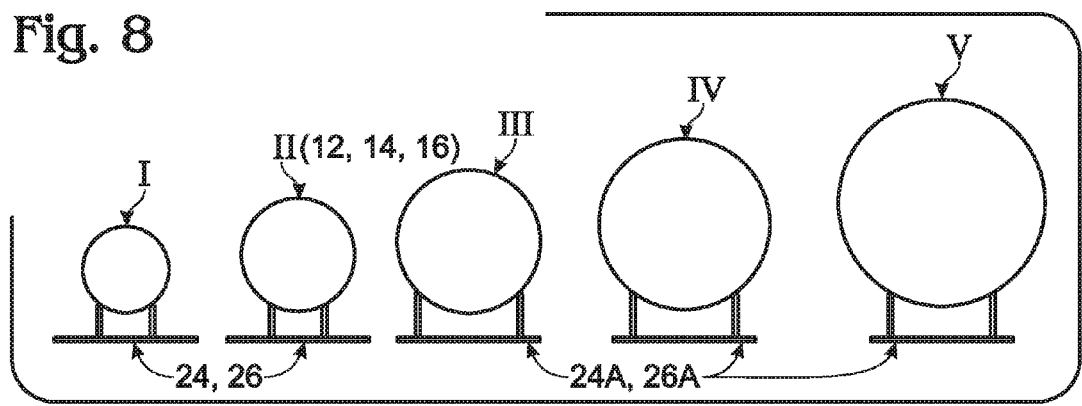

MODULAR PIPE-SHOE, PIPE-SUPPORT SYSTEM

CROSS REFERENCE TO RELATED APPLICATIONS

This application is a continuation of U.S. patent application Ser. No. 13/350,807, filed Jan. 15, 2012 which claims filing-date priority to U.S. Provisional Application Ser. No. 61/434,420, filed Jan. 19, 2011, for "Modular Pipe-Shoe, Pipe-Support System, Including Pipe-Shoe Structure, and Universal Anchors and Guides". The complete disclosures of each application are hereby incorporated by reference in their entireties for all purposes.

BACKGROUND AND SUMMARY OF THE INVENTION

This invention relates to supporting, at distributed and spaced points, long lengths of pipe, and on an open, underlying framework, such as a framework of transversely extending I-beams, or I-beam-like structures, employing a system of plural, pipe-attached pipe shoes, place-fixing pipe anchors, and place-confining, but longitudinal relative motion accommodating, pipe guides. More particularly, it pertains to a modular system featuring such shoes, anchors, and guides, and readily accommodating usage with pipes of differing diameters.

A preferred and best-mode embodiment of the system is specifically disclosed herein in a setting featuring, as an underlying, supporting framework, an organized arrangement of conventional, elongate I-beams having the usual upright, central webs, and horizontal upper and lower flanges. Accordingly all references herein which are made to I-beams and their conventional features, are so made with the understanding that such I-beam, etc. terminology is to be given broad meaning so as to include various elongate I-beam-like, i.e., elongate I-beam-characteristic, supporting structures. Those skilled in the art, from a reading of the invention disclosure herein, along with a viewing of the accompanying drawings, will readily understand how to construct, for use in conjunction with the system of the present invention, appropriate supporting framework structures that have the convenient "I-beam-like" qualities.

There are many facilities and installations wherein, extending from one location to another, are long, typically straight-linear lengths of pipe which require appropriate positionally stabilizing support provided in a manner on an underlying framework which does not inhibit a supported pipe-length's understood "need" for the non-constraining accommodation of longitudinal extension and contraction due to ambient temperature variations. Preferably, to accomplish this, it is important that the structural elements which are employed to establish the requisite locations of positionally stable support on top of a supporting framework be relatively simple in construction, easily put in place, secure in their abilities to establish positional stability without interfering with thermal expansion and contraction, and additionally, structured with a kind of "universal", modular capability for handling pipes of different diameters in a reasonable range of conventional pipe diameters.

The modular system which is proposed by the present invention uniquely, and very satisfactorily, addresses these considerations.

According to a preferred and best-mode embodiment of the invention, what is proposed is a modular system for supporting, on an underlying framework, and at plural pipe-underside locations, an elongate linear pipe having a long axis. The system includes (a) for each such location, a modular pipe shoe anchorable to the pipe's underside at that location, (b) for one only of these locations, a modular anchor fixedly securable to the framework, and adapted, when so secured, to receive and fixedly anchor the shoe, and thus the pipe also, at the one only location, against any motion relative to the framework, and (c) for each other pipe-underside location, a modular guide fixedly securable to the framework, and adapted, when so secured, guidably to receive the particular shoe disposed at such other location in a manner permitting it, and thus the pipe also, at this other location solely reversible sliding motion relative to the framework along a line substantially paralleling the pipe's long axis.

A long pipe length supported through such modular-shoe, single-anchor, and plural-guide systemic components is well stabilized positionally, and though the single anchor point of pipe-length support cannot move relative to the underlying, supporting frame work, the remainder of the pipe length can lengthen and shrink as needed to respond to ambient thermal variations.

Another way of expressing the invention is that it features a modular system for supporting, on plural, linearly spaced and distributed points of support furnished in an underlying framework, an elongate linear pipe having an underside, and extending above the framework with its long axis disposed linearly from support point to support point in the framework—this system including (1) for each support point, and adapted to sit there on the framework, a modular pipe shoe anchored to the pipe's underside at an appropriate, selected location disposed along the length of the pipe, (2) for one only of the support points, a modular anchor fixedly securable to the framework at that one only support point, adapted, when so secured, fixedly to receive, and to lock against any motion relative to the framework, as a locked shoe, the shoe which is anchored to the relevant, associated pipe-underside location disposed along the pipe's length, and (3) for each other support point, a modular guide fixedly securable to the framework at such other support point, adapted, when so secured, guidably to receive, as a guided shoe, the particular shoe which is anchored to the relevant such-other-support-point-associated pipe-underside location disposed along the pipe's length, and to capture that guided shoe in a manner permitting only reversible sliding movement of the guided shoe on top of and relative to the framework along a line substantially paralleling the pipe's long axis.

As specifically illustrated and described herein, a length of pipe "handled" by the system of the invention derives underlying support from a framework formed with plural, elongate, laterally spaced, coplanar, parallel I-beams whose upper flanges occupy a substantially common plane, with a supported pipe extending with its long axis substantially normal to the long axes of the I-beams. This common plane is preferably, though not necessarily, horizontal. The single, employed anchor, and each of the plural, employed guides, includes clamping structure for securing and positionally stabilizing an associated pipe length at a different support point to the upper flange in a different I-beam in the underlying framework.

Each shoe possesses a planar, rectangular base, or base plate, with a selected thickness, and laterally outwardly facing front, rear and lateral edges, and each clamping structure includes a pair of laterally spaced, elongate clamping elements each adapted, during a condition of securement of the respective, associated anchor or guide to an I-beam upper flange, to lie adjacent one of said shoe's edges. In a more particular sense, the clamping elements in an anchor are specifically adapted to lie, one each, adjacent a shoe's front and rear edges and against the undersides of the opposite edges in an I-beam's upper flange, and the clamping elements in each guide are specifically adapted to lie, one each, adjacent a shoe's lateral edges and in a condition spanning the upper surface of an I-beam's upper flange between those edges. Additionally, the clamping-structure elements in each guide have thicknesses substantially matching the thickness of a shoe base, and include spaced confrontingly facing, parallel guide edges that are guidingly engageable with the lateral edges in a shoe base, and attached to each guide's clamping-structure elements is a laterally projecting tab adapted to overlie the base of a shoe which is guidingly associated with the guide.

These and other features of the present invention will become more fully apparent as the detailed description which follows below is read in conjunction with the accompanying drawings.

DESCRIPTIONS OF THE DRAWINGS

FIG. 1 is a simplified, schematic, fragmentary, isometric illustration of a portion of a pipe-support installation including an underlying, supporting, I-beam framework, and employing, on top of this framework (which is not specifically a part of the present invention), and in its preferred, and best-mode form, the pipe support modular system of the present invention pictured attaching lengths (long stretches) of three, elongate, generally horizontally disposed pipes on the tops of three, I-beam upper flanges in the framework.

Short lengths of dashed lines lying coincident with the long axes of the three illustrated pipes—these lines being disposed adjacent the right side of FIG. 1 as schematic, length-extensions of the pipes—picture, in an exaggerated fashion, and as will be explained below, a representative range R of longitudinal expansion (extension) and contraction permitted the three pipes. This range illustration is not drawn to scale. The schematic representations of the three pipes presented fragmentarily in solid lines represent contracted states for the pipes, and the dashed-line "extensions" represent pipe expansions.

FIG. 2 is an enlarged-scale, isometric, fragmentary detail taken generally in the area embraced by circularly curved arrow 2 in FIG. 1, illustrating, in solid lines, the structure of one configuration of a modular pipe shoe, and of a modular anchor, employed in the system of the invention as shown generally in FIG. 1, with this shoe pictured in FIG. 2 anchored in place atop the upper flange in one of the I-beam supports illustrated in FIG. 1, such anchoring employing the mentioned modular anchor which is constructed in accordance with the invention.

Isometric FIG. 3, a fragmentary view which is somewhat similar to FIG. 2, is taken in the area embraced by circularly curved arrow 3 in FIG. 1, is drawn on essentially the same scale as that employed in FIG. 2, and illustrates, in solid lines, the same configuration of a modular pipe shoe which forms part of the present invention and which is similarly shown in FIG. 2, stabilized in place, but allowed a certain amount of longitudinal (thermal expansion/contraction) sliding motion relative to, a modular guide constructed in accordance with the invention, which guide is shown anchored to the upper flange in another one of the I-beam underlying supports pictured in FIG. 1.

As was just mentioned, FIGS. 2 and 3 each illustrates, in solid lines, the same-embodiment modular pipe-shoe configuration. This configuration is one which includes two, relatively closely spaced, parallel-planar, plate-like risers that stand up from a planar, rectangular base plate, to which they are joined, to support a range of relatively small-diameter pipes to the undersides of which, at longitudinally spaced locations, they are attached as by welding. In dash-double-dot lines in these two figures, an alternative invention configuration for this same pipe shoe is shown, with the risers in each such alternative shoe of this configuration being somewhat taller, and more widely spaced on the associated base plate from which they stand. This shoe configuration is specifically designed to handle a different size-range of pipes having larger diameters.

As can be seen by relating FIGS. 1, 2 and 3, the pipe shoes pictured in FIGS. 2 and 3 are attached to the same pipe.

Figure 5:
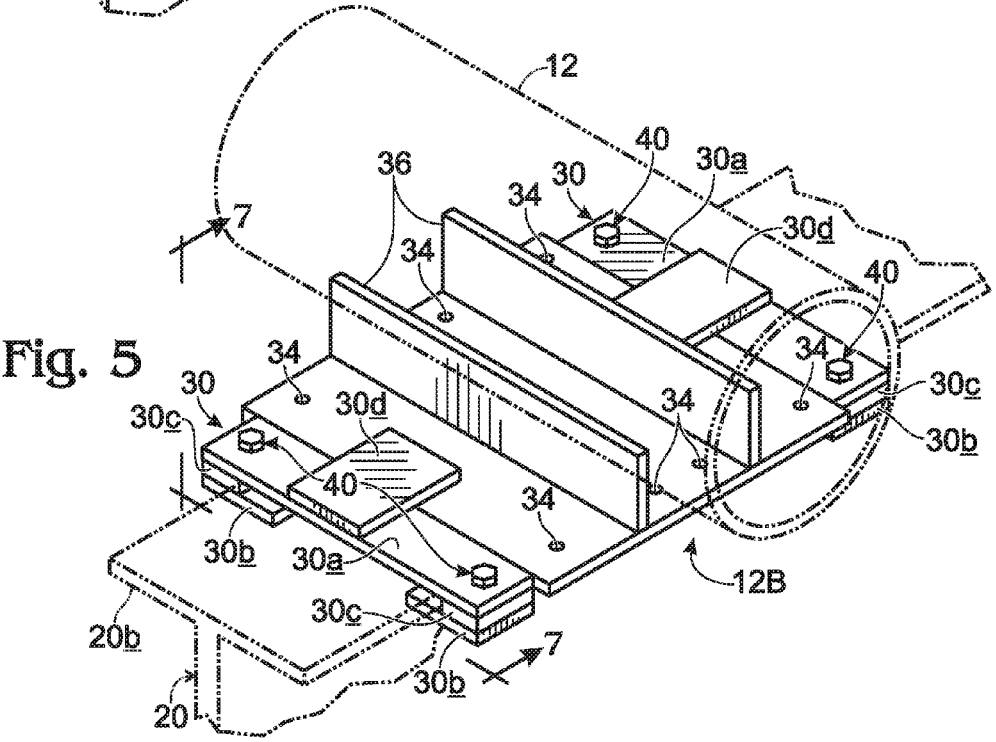

FIGS. 4 and 5 are fragmentary isometric views similar to, but larger in scale than, FIGS. 2 and 3, respectively, and are drawn from the same reference-numeral "2/3" regions circled in FIG. 1. Looking at these two figures in relation to FIGS. 1, 2 and 3, they are seen to illustrate, in further and larger detail, the FIG. 2 and the FIG. 3 anchor and guide pipe-shoe attachments that are made both to the underside of a commonly supported pipe, and to the same pair of spaced, underlying, supporting I-beams' upper flanges that appear fragmentarily in FIGS. 2 and 3—such I-beam flanges being shown fragmentarily here in dash-double-dot lines. FIGS. 4 and 5 each also picture, in dash-double-dot lines, fragments of the pipe to the underside of which, at two longitudinally spaced points of support, or locations, are attached, as by welding, the risers in the illustrated shoes.

FIGS. 6 and 7 are even larger-scale, fragmentary side elevations taken generally along the lines 6-6 and 7-7, respectively, in FIGS. 4 and 5, respectively. FIG. 6 specifically further illustrates the modular anchor shown in FIGS. 2 and 4, and FIG. 7 specifically further pictures the modular guide of FIGS. 3 and 5.

FIG. 8 is a simplified, schematic, pipe-long-axial view illustrating, comparatively, five pipes, in a range of five different pipe diameters, with underside of each pipe shown joined to the top edges of the risers in the appropriate one of the two different pipe-shoe configurations mentioned above in relation to the descriptions of FIGS. 2 and 3. The two, adjacent pipes pictured on the left-hand side of this figure—the smaller diameter pipes—are shown joined to the risers in the specific pipe-shoe configuration which is illustrated in solid lines in each of FIGS. 2-7, inclusive. The three other pipes—larger in diameters—are shown joined to the risers in the alternative configuration pipe shoe which is pictured in dash-double-dot lines in FIGS. 2 and 3.

DETAILED DESCRIPTION OF THE INVENTION

Turning now to the drawings and beginning with FIG. 1, indicated generally and fragmentarily at 10 is a portion of a pipe-support installation utilizing the modular system of the present invention to furnish connection support for lengths of three, illustrated, elongate, straight-linear, steel pipes 12, 14, 16, having long axes 12*a*, 14*a*, 16*a*, respectively, shown by dash-dot lines. These pipe lengths are shown supported, at what are referred to herein both as plural, pipe-underside locations, and as plural support points, such as the three such locations, or points, generally designated 12A, 12B, 12C for pipe 12, by an underlying, open support framework which is illustrated partially in FIG. 1 by a bracket 17. Framework 17 includes plural (three only are shown), spaced-apart, elongate and generally parallel, conventional I-beams shown at 18, 20, 22 having long axes shown at 18A, 20A, 22A, respectively. In installation 10, pipes 12, 14, 16 extend in spaced-apart, parallel relationship, with their respective long axes disposed at right angles to the respective long axes of the three, illustrated I-beams.

Pipes 12, 14, 16, each of which, along with each of the illustrated, supporting, underlying-framework I-beams, is shown only fragmentarily and schematically in FIG. 1, are representative of pipes that extend over relatively long-distance, straight linear stretches between, for example, spaced-apart buildings or other pipeline-associated facilities (not shown in the drawings). As has been mentioned above, and as will become fully apparent to those generally skilled in the art, pipes of various different diameters are readily accommodated by the elements (components), shortly be described, that are included in the system of the present invention. In the particular illustration which is presented in FIG. 1 herein, pipes 12, 14, 16 have a common, conventional-size diameter of about 16-inches. It should be understood that while all of the pipes presented for discussion herein in installation 10 have a representative, common diameter, other installations might include a mixture of pipes of different diameters. The modular characteristic of the present invention easily allows for this situation, notwithstanding that slightly different pipe shoe configurations, i.e., riser spacings in shoes, will probably be required to accommodate such a mix of pipe-diameter sizes. Shoe base plates are always the same in size for a given "system embodiment" of the invention, and all such base plates always fit properly with the system anchors and guides.

The I-beams which make up framework 17, and here turn attention for a moment to FIGS. 2 and 3 which show portions of I-beams 18, 20, respectively, include the usual upright central webs, such as webs 18a, 20a, and (herein) horizontal upper 18b, 20b, and lower 18c, 20c, flanges, respectively. While different installations employing I-beam supporting frameworks may differ, in framework 17 the upper surfaces (not specifically labeled) of the upper I-beam flanges lie in a substantially horizontal plane which is shown fragmentarily by a dash-double-dot line 17a in FIG. 1. The specific, distributed points of support furnished by framework 17 for pipes 12, 14, 16 herein coincide with the locations where the pipes and the I-beams intersect, such as at the above-mentioned pipe-underside locations 12A, 12B, 12C.

Adding attention now to FIGS. 2-7, inclusive, along with FIG. 1, the modular system of the present invention includes three modular components, preferably made of steel, including a pipe shoe, or shoe, a pipe anchor, or anchor, and a pipe guide, or guide. In each of FIGS. 2-7, inclusive, two solid-outline shoes of the same-configuration, but specifically differently located, are shown generally at 24, 26. As will shortly be explained, shoe 24 is referred to herein as a locked shoe, and shoe 26 as a guided shoe. As mentioned earlier, each of these shoes has the appropriate riser size and spacing for attachment to a 16-inch diameter pipe, such as pipe 12. The earlier referred-to alternative, riser-size-associated shoe configuration seen in dash-double-dot outline in FIGS. 2 and 3 are indicated at 24A, 26A in these two figures. In FIGS. 6 and 7, shoes 24, 26 are shown attached by welds 27 to the illustrated, adjacent pipe-underside locations in fragmentarily shown pipe 12. Shown generally at 28 in FIGS. 2, 4 and 6, is an anchor fixedly secured by clamping (which will be explained shortly) to the upper flange 18b in I-beam 18. FIGS. 3, 5 and 7 illustrate, generally at 30, a modular guide, also referred to as a shoe guide, fixedly secured by clamping (which will also be explained shortly) to the upper flange 20b in I-beam 20. Details of these three, different modular system components, including details of the elements which permit clamping of an anchor and of a guide to an I-beam flange, will be described below.

At every point of pipe support which is furnished at the various pipe-underside locations of and for pipes 12, 14, 16, a pipe shoe, such as pipe shoes 24, 26, is anchored, as mentioned above by welding, to the pipe at that underside location. In installation 10, where, in FIG. 1, nine of these shoes are illustrated in a very small-scale manner, these pipe shoes, where the three illustrated pipes extend over I-beam 18, are received and fixedly anchored by same-construction modular anchors 28. It will be apparent to those skilled in the art that, with respect to each elongate, straight-linear length of pipe, there will be only one underlying support point on an underlying supporting framework, such as framework 17, wherein an anchor module is employed. With respect to each supported pipe, this affixed and anchored pipe support-point location is referred to the "one only" point of support where anchoring takes place, and a shoe located at that point is referred to herein as a locked shoe. These firmly anchored points of support non-movably stabilize the overlying pipes at such points, permitting, of course, no relative motion at that point between the immediately supported pipe underside location and the supporting framework. It will also be apparent to those skilled in the art that, in very extensive pipe-support installations, where pipe angle structures, such as elbows, may be employed to accomplish proper pipe routing, each straight-linear stretch, or length, of such a routed pipe will be furnished with such a "one only" affixed/anchored point of framework support.

At each other pipe-underside location of support, referred to herein as an "each other point of support", the shoe associated with that point is received slidably within a same-construction modular guide 30. In the installation which is pictured in FIG. 1, these guided points of support are those points of support where the three illustrated pipes intersect and lie over beams 20, 22. A shoe located at each of these guided, "other" points of support is referred to as a guided shoe, and such a shoe is permitted only a single-axis-direction (of the usual three, orthogonal axis-of-motion directions) of relative motion, and namely relative motion along the associated pipe's long axis, so as to accommodate thermal expansion and contraction of that pipe depending upon ambient temperature conditions (Refer to schematically illustrated/exaggerated expansion-contraction range R shown in FIG. 1).

Describing now in fuller detail the modular pipe shoe, pipe anchor and pipe guide structures which make up the system of the invention, and beginning with the construction of a pipe shoe, this structure/component will be described specifically in relation to locked shoe 24 as seen in FIGS. 2, 4 and 6, recognizing that guided shoe 26, and all of the other shoes in installation 10, is(are) identical. While shoe construction, overall, is presented visually most completely in FIGS. 2, 4 and 6, one aspect of this construction, namely, a pattern of plural throughbores existing in each shoe base, is best seen in FIG. 3 specifically in to the illustration therein of shoe 26. Accordingly, a digression in shoe description to shoe 26 as seen in FIG. 3 is made below at the appropriate point in the shoe-construction description.

Shoe 24 includes a flat, planar, rectangular base 32 having an appropriate thickness T (see FIG. 7), which might be about ½-inches, and laterally outwardly facing front, 32a, rear 32b, and opposite lateral 32c, edges. Furnished in, and extending through, base 32, as a pattern disposed along its front and rear edges, as shown especially well in FIG. 3 for base 32 in shoe 26, are pre-drilled, nut-and-bolt accommodating throughbores, such as those pictured at 34. These throughbores are relevant to clamping, or locking in place, of a shoe via a shoe anchor, to the upper flange in a I-beam in installation 10. Base 32 has welded to its upper face a pair of appropriately, laterally spaced-apart upwardly extending, substantially parallel planar risers 36.

As has been mentioned, and to some extent also suggested, above, the pipe shoe of this invention may be made essentially in the basic form just described, but with alternative configurations involving different specific heights and lateral spacings of risers designed to accommodate attachment to the undersides of differently sized (diametered) elongate pipes (see alternate shoes 24A and 26A in FIGS. 2 and 3, respectively), and may also be modified in an overall size manner to suit different installation applications. Such overall size modifications will not affect system modularity so long as the companion anchor and guide structures are scaled to match—a task easily performed by one skilled in the art.

Making another system-description digression here, and with attention directed for a moment specifically to FIG. 8, here, at I, II, III, IV, V, are shown five, representative, different-diameter-size pipes, to the undersides of which are attached (a) a shoe like shoes 24, 26 (pipes I and II), and (b) a shoe like shoes 24A, 26A (pipes III, IV, V). Pipe II is representative, in diameter size, of previously discussed pipes 12, 14, 16 in installation 10.

Regarding the "footprint" size of base 32, this is certainly a matter of user choice, and will depend much on the nature of the intended, underlying, framework support structure. In installation 10, the dimension between the front and rear edges of base 32 is appropriately chosen to be enough greater than the lateral dimension of the upper surface in the upper flange of a "to-be-accommodated", underlying, supporting-framework I-beam so that all throughbores 34 will be outwardly clear of the opposite edges of such a flange. This condition is illustrated in the drawings, and its reason is to furnish nut-and-bolt clear access for immobility-clamping by a shoe anchor of a shoe at its front and rear edges where that shoe is required to be in a fixed/immovable condition at a particular location on such a flange. The base dimension between opposite, lateral edges 32c herein is approximately the same as that between the front and rear edges.

Anchor 28 includes two, identically-constructed portions, referred to collectively as clamping structure, which portions are clearly pointed out in FIGS. 2, 4 and 6—these portions being employed along the opposite edges of an I-beam's upper flange, such as upper flange 18b in I-beam 18, to clamp the front and rear edges 32a, 32b in a locked shoe, such as in locked shoe 24 (see particularly FIGS. 2, 4 and 6), fixedly in place on top of such a flange. Each of these anchor portions includes (a) an elongate clamping element 28a, which is intended to sit beneath the underside of an I-beam flange, in an appropriately overlapping fashion, so as to be drawn by clamping pressure against this underside, and (b) an appropriately sized and constructed spacer 28b which is elongate, and disposed intermediate clamping element 28a and the outwardly extending front or rear lateral edge in a shoe, such as is pictured with respect to shoe 24 in FIGS. 2, 4 and 6. Spacer 28b has a thickness preferably just slightly less than the thickness of an I-beam flange so that appropriate clamping pressure may be developed by a suitably installed and tightened nut-and-bolt sets, such as those shown at 38, in which the bolt shanks extend through the throughbores, previously mentioned and designated at 34, in the front and rear lateral edges of a shoe, and through appropriately aligned throughbores (not specifically shown) prepared in clamping element 28a and in spacer 28b.

The dimensioning just stated for the thickness of spacer 28b is relevant to a spacer which is formed of a rigid material, such as steel, but it should be understood that other specific kinds of spacers, such as an elastomeric spacer having a slightly greater thickness dimension, or even another kind of rigid-material spacer which may have a special shape to accommodate the development of clamping pressure, may, of course, be used.

Each shoe guide 30 also includes a pair of portions, referred to collectively as clamping structure—these portions being clearly illustrated as will now be described in FIGS. 3, 5 and 7. The shoe guides, and specifically the two "clamping" portions in each of these guides, at the appropriate locations associated with an underlying support framework, such as framework 17, in association with guided pipe shoes, become clamped along with those shoes in place to the upper flanges in the supporting I-beam(s). The "clamping-structure" portions in each guide are there disposed adjacent the laterally opposite sides 32c in a shoe. Each guide "clamping" portion includes an elongate clamping element 30a, and associated with that element (a) a pair of spaced clamping plates 30b, and for each clamping plate a spacer 30c. Clamping element 30a has a thickness generally matching, though preferably just slightly greater than, previously mentioned thickness T of a shoe base 32. Spacers 30c have structural material-and-thickness-dimensional characteristics like those mentioned for spacers 28b.

Further included in each guide 30 are two laterally inwardly (toward one another) projecting tabs 30d, one each longitudinally and generally centrally attached to the top surface of a clamping element 30a as shown.

As can be seen well in FIGS. 5 and 7, each guide, when properly clamped in place to guide a guided shoe, is so clamped through the tightening of nut-and-bolt sets such as those shown at 40 for which there are provided appropriate, though not specifically shown and labeled, accommodating throughbores furnished in parts 30a, 30b, 30c. A guide, when disposed properly relative to a guided shoe, permits relative longitudinal, expansion/contraction motion the associated guided shoe, such as shoe 26, while at the same time restraining all relative motion in the two, other, recognized orthogonal directions, namely in a lateral direction substantially paralleling the long axis of an underlying supporting I-beam, and vertically. Lateral-relative-motion restraint comes from the sides of clamping elements 30a which slidably engage the opposite lateral edges in a shoe base, such as lateral edges 32c, and vertical relative-motion restraint comes from the shoe-base-overlapping undersides of tabs 30d which slidably engage the upper surfaces of the lateral sides of a shoe base's adjacent lateral edges, such as edges 32c.

We claim:

1. A pipe support system, comprising:
a framework including a first beam and a second beam, wherein each beam has an upright central web between a horizontal upper flange and a horizontal lower flange;
a length of pipe arranged transverse to the beams;
a first shoe and a second shoe connected to the length of pipe and extending from the length of pipe to the first beam and the second beam, respectively, wherein each shoe includes a base supported by and disposed on a top side of one of the horizontal upper flanges;
an anchor mounted to the base of the first shoe and firmly securing the first shoe to the first beam; and a guide mounted to the second beam and permitting the base of the second shoe to slide parallel to a long axis defined by the length of pipe while restricting vertical motion of the base of the second shoe away from the second beam and also restricting horizontal motion of the base of the second shoe orthogonal to the long axis defined by the length of pipe;

wherein each base includes a rectangular base plate, wherein the anchor includes a pair of elongated anchor brackets mounted to a first pair of opposite edge regions of the base plate of the first shoe, wherein the first pair of opposite edge regions and the length of each elongated anchor bracket of said pair of elongated anchor brackets are orthogonal to the long axis of the length of pipe, wherein the guide includes a pair of elongated guide brackets mounted adjacent a second pair of opposite edge regions of the base plate of the second shoe, and wherein the second pair of opposite edge regions and the length of each elongated guide bracket of said pair of elongated guide brackets are parallel to the long axis of the length of pipe.

2. The pipe support system of claim 1, wherein each shoe includes a riser that extends from the base plate to the length of pipe and vertically spaces the base plate from the length of pipe.

3. The pipe support system of claim 1, wherein the base plate of the first shoe has a top surface opposite a bottom surface and defines a first plurality of holes extending through the base plate between the top surface and the bottom surface, and wherein a bolt extends through each hole.

4. The pipe support system of claim 3, wherein each hole of the first plurality of holes defines an axis extending centrally through the hole and spaced from the first beam.

5. The pipe support system of claim 3, wherein the base plate of the second shoe defines a second plurality of holes that correspond to the first plurality of holes, and wherein each hole of the second plurality of holes is unoccupied.

6. The pipe support system of claim 3, wherein the first pair of opposite edge regions are spaced from one another on a line parallel to the long axis defined by the length of pipe, and wherein the first plurality of holes include a distinct set of holes arranged along each of the opposite edge regions of the first pair of opposite edge regions.

7. The pipe support system of claim 1, wherein the upper flange of the first beam has a pair of flange regions extending in opposite directions from the upright central web, wherein each said elongated anchor bracket of said pair of elongated anchor brackets forms a clamp with the base plate of the first shoe, and wherein the clamp secures the base plate of the first shoe to one of the flange regions.

8. The pipe support system of claim 1, wherein the pair of elongated guide brackets are mounted separately to the second beam at a user-selectable spacing from one another.

9. The pipe support system of claim 8, wherein each said elongated guide bracket of the pair of elongated guide brackets has a tab that projects over a top surface of the base plate of the second shoe and restricts vertical and rotational motion of such base plate away from the second beam.

10. The pipe support system of claim 1, further comprising:
one or more other beams each at least partially supporting the length of pipe, and, for each said other beam, an additional shoe welded to the length of pipe and extending to the other beam and slidably associated with the other beam via an additional guide mounted to the other beam.

11. The pipe support system of claim 1, wherein the pipe is welded to the shoes.

12. A pipe support system, comprising:
a framework including a first beam and a second beam, wherein each beam has an upright central web between a horizontal upper flange and a horizontal lower flange;
a length of pipe arranged transverse to the first and second beams;
a first shoe and a second shoe connected to the pipe and extending downward from the pipe to the first beam and the second beam, respectively, wherein each shoe includes a base resting on the upper flange of one of the first and second beams;
an anchor mountable interchangeably to the base of the first shoe and the base of the second shoe to firmly secure either shoe to the beam on which such shoe rests; and
a guide mountable interchangeably to the first beam or the second beam to permit the base resting on the first beam or the second beam to slide parallel to a long axis defined by the length of pipe while restricting vertical motion of such base away from the beam and horizontal motion of such base orthogonal to the long axis defined by the length of pipe;
wherein each base includes a rectangular base plate, wherein the anchor includes a pair of elongated anchor brackets mounted to a first pair of opposite edge regions of the base plate of the first shoe, wherein the first pair of opposite edge regions and the length of each elongated anchor bracket of said pair of elongated anchor brackets are orthogonal to the long axis of the length of pipe, wherein the guide includes a pair of elongated guide brackets mounted adjacent a second pair of opposite edge regions of the base plate of the second shoe, and wherein the second pair of opposite edge regions and the length of each elongated guide bracket of said pair of elongated guide brackets are parallel to the long axis of the length of pipe.

13. The pipe support system of claim 12, wherein the base of the first shoe and the base of the second shoe are copies of one another.

14. The pipe support system of claim 12, wherein each said shoe includes a riser that extends from the base plate to the length of pipe and vertically spaces the base plate from the length of pipe.

15. The pipe support system of claim 12, wherein the base plate of the first shoe has a top surface opposite a bottom surface and defines a plurality of holes extending through the base plate between the top surface and the bottom surface, and wherein the plurality of holes include a distinct set of holes arranged along each edge region of the first pair of opposite edge regions.

16. The pipe support system of claim 12, wherein the upper flange has a pair of flange regions extending in opposite directions from the upright central web, and wherein each said elongated anchor bracket is adapted to form a clamp with the base plate of the first shoe to secure the base plate to one of the flange regions.

17. The pipe support system of claim 12, wherein the pair of elongated guide brackets are mountable to each beam at a user-selectable spacing from one another.

18. The pipe support system of claim 17, wherein each elongated guide bracket of said pair of elongated guide brackets has a tab adapted to overlie a top surface of the base plate of the second shoe and restrict vertical motion of the base plate away from the second beam.

19. The pipe support system of claim 12, further comprising:
    one or more other beams each at least partially supporting the length of pipe, and, for each said other beam, an additional shoe welded to the length of pipe and resting on said other beam.

20. The pipe support system of claim 12, wherein the pipe is welded to the shoes.

\* \* \* \* \*